Figure 1:
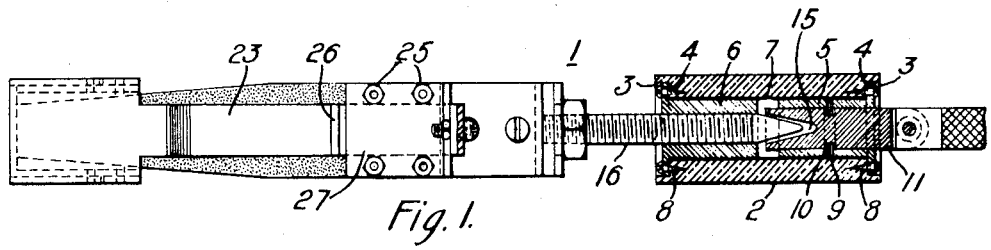

C. A. BROWN.
SOLDERING IRON.
APPLICATION FILED FEB. 25, 1919.

1,401,871.

Patented Dec. 27, 1921.
2 SHEETS—SHEET 1.

WITNESSES:
H. J. Shelhamer
O. E. Bee.

INVENTOR
Chester A. Brown
BY
Wesley G. Carr
ATTORNEY

C. A. BROWN.
SOLDERING IRON.
APPLICATION FILED FEB. 25, 1919.

1,401,871.

Patented Dec. 27, 1921.
2 SHEETS—SHEET 2.

WITNESSES:
H. T. Shelhamer
O. E. Bee.

INVENTOR
Chester A. Brown
BY
Wesley G. Carr
ATTORNEY

UNITED STATES PATENT OFFICE.

CHESTER A. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

SOLDERING-IRON.

1,401,871.     Specification of Letters Patent.    Patented Dec. 27, 1921.

Application filed February 25, 1919. Serial No. 279,070.

*To all whom it may concern:*

Be it known that I, CHESTER A. BROWN, a citizen of the United States, and a resident of Wilkinsburg, in the county of Allegheny and State of Pennsylvania, have invented a new and useful Improvement in Soldering-Irons, of which the following is a specification.

My invention relates to electric soldering irons, and it has for its primary object the provision of such tools employing suitable working elements heated by means of electric current passed through the working elements and through carbon members which engage them adjacent the parts which it is desired to heat.

One object of my invention is to employ a removable working element or heating member in an electric soldering iron and thus make possible the utilization of interchangeable points of different sizes adapted for various kinds of work.

Another object of my invention is the provision of a soldering iron so constructed that any light caused by incandescence of the carbon member, heated by the electric current, shall be reflected upon the work, thus facilitating working in dark corners as well as protecting the operator's eyes from such relatively blinding light.

A still further object of my invention is to construct an electric soldering iron having a current-controlling means which may be operated without interrupting the work and thus facilitate the control of the heat imparted to the working part of the iron.

With these and other objects in view, my invention will be more fully described, illustrated in the drawings, in the several views of which corresponding numerals indicate like parts, and then particularly pointed out in the claims.

Figure 2:
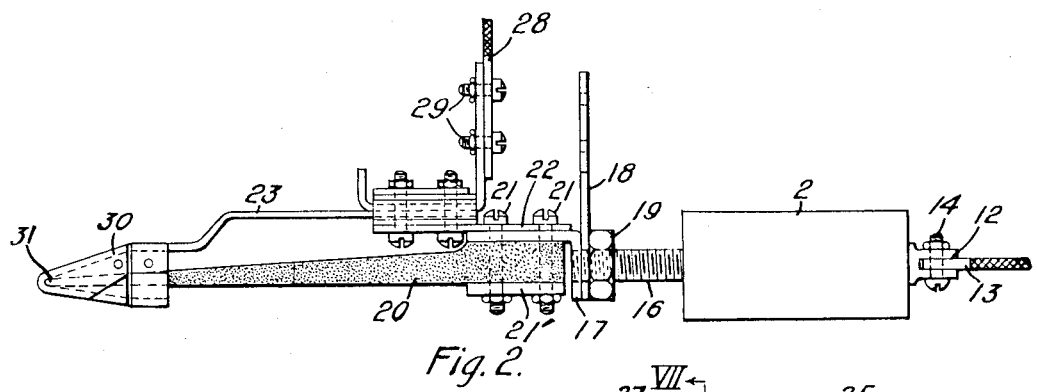
Figure 4:
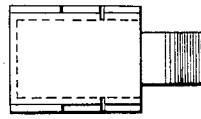
Figure 6:
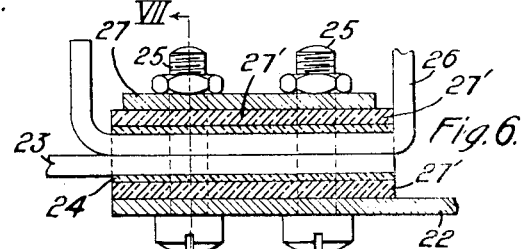
Figure 3:
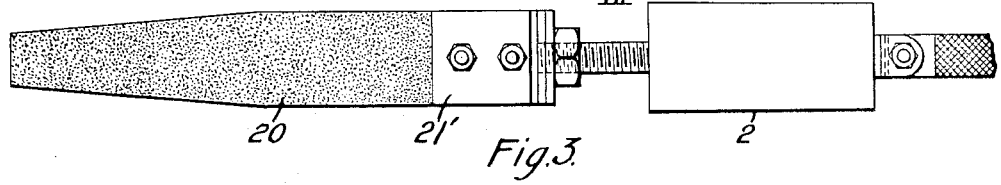
Figure 5:
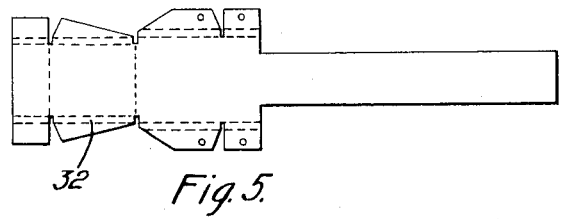
Figure 7:
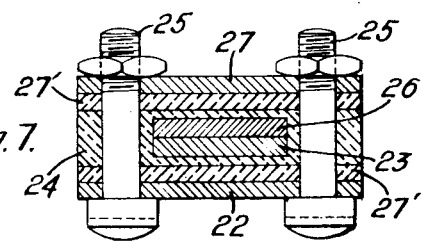
Figure 8:
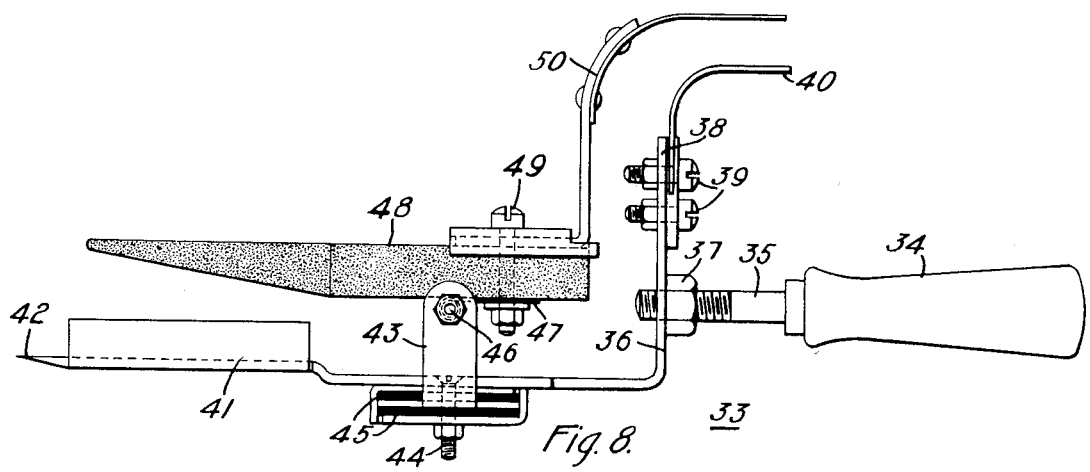
Figure 9:
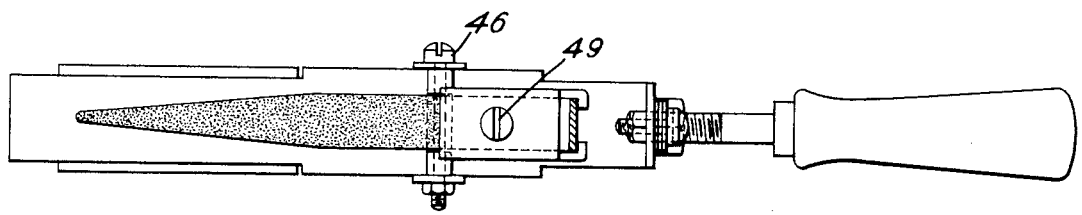
Figure 10:
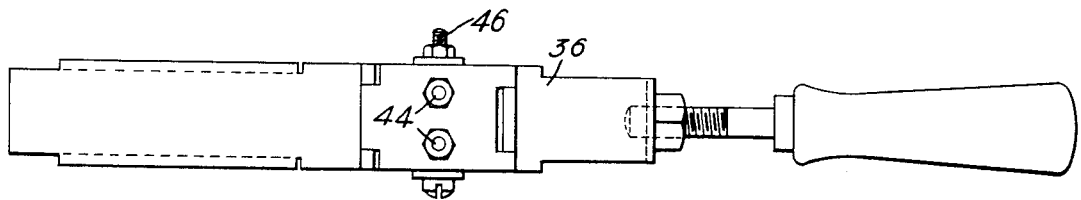

In the drawings, Figure 1 is a bottom plan view, partly in section, of an electric soldering iron embodying my invention; Fig. 2 is a reversed side elevation of the soldering iron shown in Fig. 1; Fig. 3 is a top plan view of the soldering iron shown in the previous figures, with the heating member removed; Fig. 4 is a detail plan view of the heating member or soldering point employed in the above mentioned soldering iron; Fig. 5 is a detail plan view of a prepared blank which may be bent and secured together to provide the heating member or soldering point shown in Fig. 4; Fig. 6 is a reversed detail sectional view showing the manner of supporting the removable soldering point shown in Fig. 4; Fig. 7 is a sectional view taken along the line VII—VII of Fig. 6; Fig. 8 is a reversed side elevation of a modified form of soldering iron constructed in accordance with my invention; Fig. 9 is a bottom plan view of the iron shown in Fig. 8, and Fig. 10 is a top plan view of the iron shown in Fig. 8.

An electric soldering iron 1, is shown in Fig. 1, which comprises a hollow handle 2, of any suitable insulating material, which is recessed at its ends, as indicated at 3, to provide shoulders upon which flanged portions 4 of metallic bushings 5 and 6 may be placed to countersink them beyond the ends of the handle 2. The metallic bushings 5 and 6 may be disposed within opposite ends of the handle 2 and insulated therefrom, as indicated at 7, the bushings being secured in place by screws 8 or other suitable fastening means.

The metallic bushing 5 is preferably provided with dowel pins 9 adapted to project into an annular groove 10 provided in a terminal member 11 disposed within the bushing 5 to allow the terminal member 11 to rotate but to retain it against longitudinal movement. The terminal member 11 is provided, at its end projecting from the handle 2, with a suitable slot or recess 12 adapted to receive a conductor 13 which may be secured therein by a bolt 14. The terminal member 11 is provided, at its other end, with a conical recess 15 adapted to receive the end of a threaded pin 16 which may be advanced through the bushing 6, the latter being provided with suitable threads for that purpose, the end of the pin 16 making a wedging engagement with the walls of the conical recess 15 of the terminal member 11 when the pin is advanced sufficiently through the bushing 6.

A member 17 of L-shape is attached to the end of the pin 16 that projects from the handle 2, and an additional terminal member 18 is held in engagement with the member 17 by a nut 19 on the threaded pin 16. A tapered carbon member 20 engages the member 17 and is secured thereto by means of bolts 21, which extend through the members 17 and 20 and a clamp plate 21′. The bolts 21 also clamp a supporting member 22 to the member 17, and the member 22 thus provides a suitable support for a heating member or working element 23. The manner of supporting the heating-member 23 is best illustrated in Figs. 6 and 7. As here shown, a housing 24 of insulating material, secured to the member 22 by bolts 25, is adapted to support the heating-member 23 and a member 26 of U-shape, and to insulate said members from the bolts 25. The member 26 is held in place because its bent end portions restrict its longitudinal movement. The heating-member 23 is secured in place by merely disposing its shank above the member 26, from which position it may be readily removed but will not be dislodged by any operating pressure because such pressure tends to advance the shank into the insulating housing 24. A plate 27 provides a suitable surface for the nuts of the bolts 25 to engage, and additional plates 27' of insulating material are disposed upon opposite sides of the housing 24. One end of the member 26 provides a terminal to which an electric conductor 28 may be secured by bolts 29 or by other suitable means.

The heating member 23 is formed preferably with a pocket 30 of wedge-shape adapted to receive the tapered end of the carbon member 20 which engages the extreme end portion of the pocket member 30, as indicated at 31. As shown in Fig. 5, the heating member 23 may be constructed from a suitable strip or plate, preferably of copper, cut as here indicated. Broken lines 32 indicate the manner in which the copper blank may be bent to form the pocket 30 and such pocket may have its angle, at the closed end thereof, varied by properly trimming the material to make the angle more acute or more obtuse, as desired.

In operating the soldering iron above described, the heating member thereof is so disposed that its pocket-shaped end incloses the end of the carbon member and makes engagement therewith. The handle 2 of the iron is advanced upon the threaded pin 16 so that the end of the pin is seated in the socket 15 in the terminal carried by the handle. A circuit is thus closed so that current may flow between the carbon member and the heating member engaging it. By virtue of the contact resistance established between the carbon member and the heating member, relatively high heat is provided at this point. The carbon member engages the heating member at a point as close as possible to the working portion of the heating member, and the heating member, being of a continuous piece of copper, conducts the heat to adjacent parts of the pocket member so that a sufficiently large hot surface is provided for soldering.

The carbon member, of course, is gradually consumed but is kept in contact with the heating member on account of the heating member being movably mounted in the housing 24 and being, therefore, adapted to yield, under the pressure employed against the soldering point while the iron is operated, as the end of the carbon member is consumed.

Various heating members may be employed having working ends of different degrees of angularity and, by having several heating members in readiness, they may be interchanged from time to time, with little difficulty, as the nature of the work makes it desirable. Furthermore, the heat imparted to the heating member or working element may be easily controlled by the switch provided in the supporting handle or gripping member, it being necessary merely to turn the handle in order to disengage the point of the threaded pin from the terminal carried by the handle to interrupt the current. This is a very desirable feature, as the current may be interrupted without necessity of the operator laying down either the solder or the iron in order to throw a switch to interrupt the current. An extra terminal is provided on the soldering iron so that, if desired, the switch contained in the handle of the soldering iron need not be used. The carbon member is tapered in order to concentrate the heating effect at the end thereof.

A modification of my invention is shown in Fig. 8. As here shown, a soldering iron 33 comprises a supporting handle 34 provided with a pin 35 threaded into a heating member 36 of L-shape and secured in a more rigid engagement therewith by a nut 37. The shorter leg 38 of the heating member 36 is provided with suitable openings to receive bolts 39 which may be employed to clamp a terminal of a conductor 40 thereto. The edge portions 41 of the longer leg of the member 36 are bent laterally at right angles to the plane of the member, and the extreme end thereof is provided with a relatively thin tapered edge 42. A member 43 of U-shape is clamped to the member 36 by means of screws 44 or other suitable means and is insulated therefrom, as indicated at 45. The sides of the member 43 are provided with openings to receive the ends of a bolt 46 around which is bent one end of a metal plate 47, the other end of which constitutes a support for a tapered carbon member 48. The carbon member 48 is secured between the member 47 and a terminal member 50 by a bolt 49.

In operating a soldering iron of this modified form, the terminals are connected in an electric circuit and a current flows between the heating member and the carbon member which is forced into engagement with the heating member by gravity when the soldering iron is held in the correct working position, such correct working position being that in which the carbon member is beneath the heating member.

This soldering iron has the advantage of reflecting the light, caused by the incandescence of the carbon member when subjected to a heating current, on account of the fact that the side portions adjacent the working end of the iron are so bent as to deflect the light upon the work and away from the operator's eyes. The light caused by incandescence of the carbon member is extremely bright and of such quality as to be especially irritable to the eyes. This deflection of the light upon the work also facilitates using the iron in darkened places, as is often necessary in shops or other places where an iron is employed. On account of the carbon member being held in contact with the heating member by the force of gravity, the current which heats the iron may be immediately interrupted by merely lifting the iron from the work and elevating the working end to a more nearly approximated vertical position than that usually employed when operating the iron.

Although I have described an electric soldering iron and only one modification thereof which embody my invention, it is obvious that, with minor changes in the construction, various irons embodying the principle of my invention may be provided, and I desire, therefore, that no limitations shall be imposed except such as are indicated in the appended claims.

I claim as my invention:

1. An electric soldering iron comprising a supporting handle, a heating member tapered to a relatively thin edge at one end and connected to the supporting handle at the other, a carbon member adapted to engage the heating member and mounted thereon and means for reflecting light caused by contact engagement of the two members when they are connected to a source of electric current.

2. An electric soldering iron comprising a gripping member, means for carrying electric current inclosed by the gripping member, a carbon member, means for supporting said carbon, a removable heating member engaging the carbon member, and means for connecting the heating member and the carbon member in an electric circuit.

3. An electric soldering iron comprising a hollow handle, a metallic bushing disposed within one end of the handle, a metallic member secured within the bushing and projecting beyond it, and an interiorly-threaded metallic bushing disposed within the end of the handle opposite the first bushing, a threaded metallic pin adapted to be advanced into the threaded bushing to engage the metallic member secured within the first mentioned bushing, a carbon member connected to the threaded pin, and a heating member supported to engage the carbon member at one end thereof.

4. An electric soldering iron comprising a supporting handle, a metallic pin having one end secured within the handle, a member of L-shape attached to the pin, a carbon member attached to the L-shape member, a heating-member supported by the L-shape member and insulated therefrom, the heating-member being formed with a pocket of wedge shape adapted to receive one end of the carbon member, and means for connecting the carbon member and the heating-member in an electric circuit.

5. An electric soldering iron comprising a supporting handle, a metallic pin secured within and projecting from the handle, a member of L-shape having its shorter leg attached to the pin, a tapered carbon member attached to the longer leg of the L-shape member, a heating-member removably supported by the L-shape member and insulated therefrom, the heating-member being formed with a pocket of wedge-shape adapted to receive the tapered end of the carbon member and means for connecting the carbon member and the heating-member in an electric circuit.

In testimony whereof, I have hereunto subscribed my name this 20th day of Feb. 1919.

CHESTER A. BROWN.